United States Patent [19]
Feige et al.

[11] Patent Number: 6,132,574
[45] Date of Patent: Oct. 17, 2000

[54] BOTTOM LINING FOR ELECTROLYTIC CELLS AND PROCESS FOR ITS MANUFACTURE

[75] Inventors: Reinhard Feige, Bonn; Gerhard Merker, Rockenberg, both of Germany

[73] Assignee: Aluminium-Salzschalcke Aufbereitungs GmbH, Lünen, Germany

[21] Appl. No.: 09/085,570

[22] Filed: May 27, 1998

[30] Foreign Application Priority Data

May 30, 1997 [DE] Germany ............... 197 22 788

[51] Int. Cl.[7] ............... C25B 9/00; C25C 7/00; C25D 17/00
[52] U.S. Cl. .............. 204/279; 204/196.37; 75/301; 264/104; 264/105
[58] Field of Search .............. 204/279; 264/104, 264/105

[56] References Cited

U.S. PATENT DOCUMENTS

| | | | |
|---|---|---|---|
| 3,328,280 | 6/1967 | Richards | 204/243 |
| 3,607,685 | 9/1971 | Johnson | 204/67 |
| 3,615,776 | 10/1971 | Farrington | 106/59 |
| 4,334,029 | 6/1982 | Naito | 501/109 |
| 5,132,246 | 7/1992 | Brisson | 501/96 |
| 5,149,412 | 9/1992 | Allaire | 204/243 R |
| 5,246,897 | 9/1993 | Ono | 501/101 |
| 5,407,459 | 4/1995 | Breault | 75/303 |
| 5,888,292 | 3/1999 | Tremblay | 106/691 |

FOREIGN PATENT DOCUMENTS

| | | |
|---|---|---|
| 0 318 305 | 8/1998 | European Pat. Off. . |
| 0 726 233 | 8/1998 | European Pat. Off. . |
| 41 41 186 | 8/1998 | Germany . |

*Primary Examiner*—Kathryn Gorgos
*Assistant Examiner*—Josephine Maisano
*Attorney, Agent, or Firm*—Collard & Roe, P.C.

[57] ABSTRACT

A bottom lining for electrolytic cells formed from steel pots for use in primary production and secondary refining, made from a monolithic stamping of a finely granulated powder having a high alumina content, and a process for producing same. The powder is obtained from aluminum industrial scrap recovery and salt slags and has the following components in the following amounts based on dried weight:

| | |
|---|---|
| $Al_2O_3$ | 40–90% |
| AlN | 0.1–25% |
| MgO | 4–20% |
| $SiO_2$ | 0.5–15% |
| CaO | 0.1–15% |
| Al (metallic) | 0.1–10% |
| Si (metallic) | 0.1–10% |
| $Fe_2O_3$ | 0.1–5% |
| C | not more than 5% |
| F | not more than 5% |
| $Na_2O$ | 0.1–5% |
| $K_2O$ | 0.1–2% |
| $TiO_2$ | 0.1–2% |
| Others | not more than 5% |
| Loss on ignition | not more than 10%. |

15 Claims, No Drawings

BOTTOM LINING FOR ELECTROLYTIC CELLS AND PROCESS FOR ITS MANUFACTURE

BACKGROUND OF THE INVENTION

1. Field of the Invention

This invention relates to a bottom lining for electrolytic cells and a process for its production. In particular, this invention relates to a bottom lining for aluminum electrolytic cells formed from steel pots for both primary production and secondary refining.

2. The Prior Art

Aluminum metal is produced by reducing metallurgical alumina by melt electrolysis at about 950° C. to produce primary aluminum pig. High purity aluminum metal is produced from primary aluminum pig by refining electrolysis at about 800° C. Fluoride-containing salt melts are used as the electrolyte in either process. In both processes, the electrolytic cell consists of a steel pot having dimensions of about 10 m in length and about 5m in width. The bottom surface of this pot is lined with carbon blocks that act as electrodes. A heat-insulating lining is present under the carbon. Generally, this lining consists of about 3 layers of dense chamotte bricks in the hotter zone and about 2 layers of highly porous diatomite bricks, vermiculite bricks, or calcium silicate plates in the colder zone underneath.

Bottom insulations produced by stamping metallurgical alumina powder or refractory masses of chamotte or olivine into the electrolysis pots are also known, and are sometimes employed instead of brick linings. Stamped insulating beds have an advantage over bricks and plates in that the monolithic, ramming mix has no joints to facilitate infiltration of the insulating bed by the electrolyte melt. Furthermore, less time and labor are required to produce a stamped bed. Moreover, as compared to bricks, which are solidly installed by mortar, a stamped insulating bed can be removed and replaced more easily and quickly after the useful life of the electrolytic cells has expired.

Molten and gaseous components of the electrolyte infiltrate the bottom insulation during operation of the cell and fill the open pores, leading to mineralogical transformation of the insulating material over time. This causes deterioration of the thermal insulating property of the bottom lining and limits the useful life of the electrolytic cell. In primary electrolysis, a used bottom lining made of a stamped insulating bed of metallurgical alumina can be completely reused as an aluminum oxide source in spite of its impregnation with electrolyte melt. In contrast, a consumed bottom lining based on chamotte brick or refractory compounds can only be partially reconditioned and reused.

As compared to chamotte bricks or a refractory ramming mix based on chamotte or olivine, which has a bulk density of about 2 to 2.5 g/cm$^3$ and an open porosity of about 20%, a stamped lining bed made from metallurgical aluminum oxide powder, which has a stamping density of about 1.0 g/cm$^3$ and an open porosity of about 70%, is a superior thermal insulator because of its higher porosity after an electrolytic cell has been put into operation. However, there is a greater structural change caused by infiltration of melt and thus deterioration of the thermal insulating property with an aluminum oxide stamping than with bricks because of its higher starting porosity.

Various processes are available for inhibiting infiltration of the bottom insulation. For example, chemical barrier layers based on SiO$_2$-containing melts formed by the reaction of electrolyte components with SiO$_2$-containing components of the bottom lining are used. In addition, physical infiltration barriers in the form of steel panels placed between the bottom carbons and the bottom insulation are known. The bottom insulation of an aluminum electrolytic cell is described in German Patent De 43 36 024, where the open pores of chamotte bricks are impregnated with tar to reduce the risk of infiltration.

SUMMARY OF THE INVENTION

It is therefore an object of the present invention to improve the bottom lining of electrolytic cells for primary production and secondary refining of aluminum. The improved properties comprise simpler incorporation of the insulating material in the cell pots, higher resistance to infiltration and reaction versus electrolyte melt, and easier exploitation of the consumed bottom insulation. The invention comprises a stamped pot filling produced from unfired, pre-compacted shaped elements such as pellets, briquettes or bricks based on powder products with high contents of alumina. These powder products are collected as residual materials in the recovery of aluminum scraps and aluminum salt slags.

The present invention is an improvement over prior art processes in that it allows simpler incorporation of the insulating material in the cell pots, higher resistance to infiltration and reaction versus electrolyte melt and easier exploitation of the consumed bottom lining.

According to a preferred embodiment, the pot lining is a monolithic stamping consisting of unfired and/or calcined shaped elements such as spherical pellets, egg briquettes or normal-shaped bricks, that are made of finely granulated powders with high alumina contents. These powders are collected as residues in the recovery of scraps and salt slags in the aluminum industry.

"Unfired" or "calcined" means that the shaped elements are dried and thermally treated so that they are sufficiently mechanically stable and can be transported, but not solidly sintered, so that they can be stamped. In addition, the elements have an annealing-loss moisture of less than 5%, as too much moisture would otherwise be liberated during the operation of the electrolysis pot and thus create the risk of cracking.

The finely granulated powders having a high alumina content have the following chemical composition based on dried substance:

| Chemical | Amount |
| --- | --- |
| $Al_2O_3$ | 40–90% |
| AlN | 0.1–25% |
| MgO | 4–20% |
| $SiO_2$ | 0.5–15% |
| CaO | 0.1–15% |
| Al (metallic) | 0.1–10% |
| Si (metallic) | 0.1–10% |
| $Fe_2O_3$ | 0.1–5% |
| C | not more than 5% |
| F | not more than 5% |
| $Na_2O$ | 0.1–5% |
| $K_2O$ | 0.1–2% |
| $TiO_2$ | 0.1–2% |
| Others | not more than 5% |
| Loss on ignition | not more than 10% |

According to an alternative embodiment, 90% of the particles of the finely granulated powder product have a particle diameter of less than 200 μm. The powders may be crushed in a ball mill to obtain the desired particle size. It was found in a crucible test that such powders in the compacted form of a fluoride-containing electrolyte melt are infiltrated and attacked substantially less than conventional bottom insulating materials. The higher resistance to infiltration and reaction to electrolyte melt of the finely granular powders with high alumina content obtained in the recovery of scraps and salt slags in the aluminum industry is based on the ideal combination of the chemical and mineralogical compositions of the powder particles and the mechanical strength and size distribution of the particles. The $Al_2O_3$ is present in the form of the hard mineral substances corundum and MgO-spinel. In addition, minerally soft components are present in the form of $CaF_2$ and metallic aluminum.

An advantage of the present invention is the easy reusability of the consumed bottom insulations made by stamping the finely granulated powders having high alumina content from the recovery of scraps and salt slags in the aluminum industry. These bottom insulations including the infiltrated electrolyte components can now be recycled into the general recovery of scraps and salt slags of the aluminum industry.

To produce the bottom insulation, the powders recovered from aluminum scraps and aluminum salt slags, which are already present in the ideal particle size (maximum diameter of 200 μm and mean diameter of 5–30 μm) are shaped into spherical pellets, egg briquettes or normal-shaped bricks. Preferably, a binding agent such as water, cement, clay, aluminum phosphate or methyl cellulose is added to the powder in the shaping process. Preferably, the binding agent contains between 5 and 20% clay.

The shaped bodies are filled in the electrolytic pot and the filling is compacted by stamping with a surface vibrator such as that used in road construction. Because the bottom lining must be as dry as possible when the electrolytic cell is put into operation, and no moisture may be released during the operation of the cell, the shaped bodies must be thermally pre-treated before they are filled in the electrolytic pot so that the annealing-loss moisture is as low as possible. In tests, it was found that a temperature of up to 700° C. suffices for this purpose. The drying or annealing may be carried out in a chamber furnace.

EXAMPLES

1. Testing Parameters

The packing density of a stamped filling of shaped bodies based on a finely granulated powder with a high alumina content obtained in the recovery of aluminum industry scraps and salt slags was determined by weighing and measuring stamped bodies that were compacted with a "Fischer" ram that is known in foundry technology. This packing density was compared with conventionally produced stampings according to the state of the art from metallurgical alumina powder and commercially available refractory compound.

The resistance of the stampings to electrolyte melt was determined in a crucible test. To produce the crucible from a chamotte brick usually employed for insulating the bottom of aluminum electrolytic cells, a piece 12 cm wide and long and 7 cm high was sawed off and a round bore having a diameter and depth of 5 cm was drilled into each piece. A tablet of the bottom insulating material to be tested having a diameter of 5 cm and a thickness of 2.5 cm was pressed at 600 bar and inserted into the bore of the crucible. A tablet of the same size consisting of melt electrolyte as used in the primary electrolysis of aluminum was placed on top.

The bore was subsequently covered with a plate of chamotte stone having a thickness of 1 cm. The crucible was heated in a laboratory chamber furnace at 950° C. for 24 hours and then cooled and cut with a saw. This revealed the extent to which the test tablet was infiltrated by the electrolyte melt.

2. Powder Composition

The powder of high alumina content obtained in the recover of aluminum scraps and aluminum salt slags and used in the examples had the following properties:

Chemical Composition:

| | |
|---|---|
| $Al_2O_3$ | 65% |
| MgO | 8.6% |
| $SiO_2$ | 7% |
| CaO | 3% |
| F | 2.2% |
| $Fe_2O_3$ | 1.6% |
| C | 1.2% |
| $Na_2O$ | 1% |
| $NH_3$ | 0.5% |
| $K_2O$ | 0.4% |
| Loss on ignition | 8% |

Crystalline Components

| | |
|---|---|
| Corundum | $Al_2O_3$ |
| Spinel | $MgOxAl_2O_3$ |
| Fluorite | $CaF_2$ |

Particle Size

| | |
|---|---|
| <200 μm | 90% |
| d50 | 15 μm |

3. Test Results

| Stamping Material | Packing Density g/cm$^3$ | Crucible Test Infiltration |
|---|---|---|
| Shaped Elements (egg briquettes) from Powder with high alumina content and 10% binding clay Comparative examples | 1.8 | low |
| Metallurgical Al2O3 | 1.1 | high |
| Olivine stamping compound | 2.4 | low |

The examples show by comparison that when a stamped filling of shaped bodies produced from finely granulated powder with a high alumina content obtained in the recovery of aluminum scraps and salt slags is used instead of metallurgical alumina powder, infiltration of electrolyte melt is as low as with a commercially available olivine stamping compound. However, the packing density is distinctly lower with such a stamped filling, thus resulting in a filling having superior thermal insulation and less material consumption.

Accordingly, while only a few embodiments of the present invention have been shown and described, it is obvious that many changes and modifications may be made thereunto without departing from the spirit and scope of the invention.

What is claimed is:

1. A recyclable bottom lining for aluminum electrolytic cells formed from steel pots for use in primary production and secondary refining as a layer of heat insulating refractory underlying a bottom carbon electrode, comprising a monolithic stamping of unfired shaped elements of a finely granulated powder having a high alumina content, said stamping formed under a pressure of about 600 bar, said powder obtained from aluminum scrap recovery and salt slags and having the following components in the following amounts based on dried weight:

| $Al_2O_3$ | 40–90% |
|---|---|
| AlN | 0.1–25% |
| MgO | 4–20% |
| $SiO_2$ | 0.5–15% |
| CaO | 0.1–15% |
| Al (metallic) | 0.1–10% |
| Si (metallic) | 0.1–10% |
| $Fe_2O_3$ | 0.1–5% |
| C | not more than 5% |
| F | not more than 5% |
| $Na_2O$ | 0.1–5% |
| $K_2O$ | 0.1–2% |
| $TiO_2$ | 0.1–2% |
| Others | not more than 5% |
| loss on ignition | not more than 10% | said shaped elements in a form selected from the group consisting of pellets, briquettes, and normal shaped bricks and being thermally treated to less than 5% annealing loss, and said monolithic stamping having a final particle size and distribution that causes the stamping to be resistant to 100% infiltration by electrolyte melt.

2. The bottom lining according to claim 1, wherein the shaped elements are unfired.

3. The bottom lining according to claim 1, wherein the powder is present in two phases, a corundum phase made of alpha $Al_2O_3$, and a spinel phase made of MgO x $Al_2O_3$, wherein the spinel component comprises 15–70% by weight of the powder.

4. The bottom lining according to claim 1, wherein 90% of the powder particles have a diameter of <200 μm.

5. The bottom lining according to claim 1, wherein the powder has a mean particle diameter of from 5 to 30 μm.

6. The bottom lining according to claim 1, wherein the lining comprises a layered composite of said monolithically stamped shaped elements and additional refractory insulating materials.

7. The bottom lining according to claim 1, wherein the monolithic stamping has a bulk density of about 1.8 g/cm³.

8. A process for producing a recyclable bottom lining for an aluminum electrolytic cell formed from a steel pot for use in primary and secondary refining, as a layer of heat insulating refractory underlying a bottom carbon electrode, comprising:

a) producing a finely granulated powder from the recovery of scraps and salt slags of the aluminum industry by grinding, leaching, filtering and thermally treating said powder, said powder having the following chemical composition based on dried weight:

| $Al_2O_3$ | 40–90% |
|---|---|
| AlN | 0.1–25% |
| MgO | 4–20% |
| $SiO_2$ | 0.5–15% |
| CaO | 0.1–15% |
| Al (metallic) | 0.1–10% |
| Si (metallic) | 0.1–10% |
| $Fe_2O_3$ | 0.1–5% |
| C | not more than 5% |
| F | not more than 5% |
| $Na_2O$ | 0.1–5% |
| $K_2O$ | 0.1–2% |
| $TiO_2$ | 0.1–2% |
| Others | not more than 5% |
| loss on ignition | not more than 10% | b) forming the powder product into shaped elements having a shape selected from the group consisting of pellets, briquettes and normal-shaped bricks;

C) thermally treating the shaped elements to less than 5% annealing loss, said step of thermally treating being accomplished by a process selected from the group consisting of drying, sintering and calcining;

d) filling the shaped elements in the steel pot and compacting the shaped elements by stamping under a pressure of about 600 bar to create a monolithic stamped lining having a final Particle size and distribution that causes the lining to be resistant to 100% infiltration by electrolyte melt; and e) recycling the consumed bottom lining into step a).

9. The process according to claim 8, wherein the powder is crushed Into particles having a maximum diameter of 500 μm and a mean diameter of from 5 to 30 μm.

10. The process according to claim 8, further comprising crushing the powder in a ball mill.

11. The process according to claim 8, wherein the step of forming the powder into shaped bodies includes adding a binding agent to the powder.

12. The process according to claim 11, wherein the binding agents are selected from the group consisting of water, cement, clay, aluminum phosphate and methyl cellulose.

13. The process according to claim 11, where in the binding agent is 5–20% clay.

14. The process according to claim 8, wherein the thermal treatment occurs at temperature of up to 700° C.

15. The process according to claim 8, wherein the shaped elements are stamped to a bulk density of about 1.8 g/cm³.

* * * * *

UNITED STATES PATENT AND TRADEMARK OFFICE
CERTIFICATE OF CORRECTION

PATENT NO.   : 6,132,574
DATED        : October 17, 2000
INVENTOR(S)  : Feige et al.

It is certified that error appears in the above-identified patent and that said Letters Patent is hereby corrected as shown below:

Title page, Item [73], Column 1,
Change the spelling of the assignee to read:
-- Aluminum Salzschlacke Aufbereitungs GmbH --.

Signed and Sealed this

Twentieth Day of November, 2001

Attest:

NICHOLAS P. GODICI
*Attesting Officer*   *Acting Director of the United States Patent and Trademark Office*